United States Patent [19]

Seri et al.

[11] Patent Number: 5,295,123
[45] Date of Patent: Mar. 15, 1994

[54] AUTOMATIC PLAYING APPARATUS

[75] Inventors: Kazuyuki Seri; Mineyuki Noda; Toshio Yamabata, all of Osaka, Japan

[73] Assignee: Roland Corporation, Osaka, Japan

[21] Appl. No.: 791,677

[22] Filed: Nov. 14, 1991

[30] Foreign Application Priority Data

Nov. 14, 1990 [JP] Japan ..................... 2-308337

[51] Int. Cl.$^5$ ............................................. G11B 17/22
[52] U.S. Cl. ........................... 369/32; 369/47; 369/48; 84/645
[58] Field of Search ............... 369/32, 47, 48; 84/645

[56] References Cited

U.S. PATENT DOCUMENTS

| | | | |
|---|---|---|---|
| 4,787,073 | 11/1988 | Masaki | 369/32 |
| 4,996,679 | 2/1991 | Yoshio | 369/32 |
| 5,097,459 | 3/1992 | Yoshio | 369/32 |

*Primary Examiner*—Steven Mottola
*Assistant Examiner*—R. A. Ratliff

*Attorney, Agent, or Firm*—Sixbey, Friedman, Leedom & Ferguson

[57] ABSTRACT

First tune information of playing information is read out from playing information storage means to a selected one of predetermined positions and then a selected one of a plurality of pieces of second tune information is read out without incurring the possibility of introducing discontinuity or unnaturalness between musical sounds reproduced from the first tune information and the second tune information.

The predetermined positions on the first tune information are made to correspond to the plurality of pieces of second tune information, and control means is provided for controlling tune information read means so that when the first tune information has been read out to the selected one of the predetermined positions respectively corresponding to the plurality of pieces of second tune information, that one of the pieces of second tune information corresponding to the selected predetermined position is automatically read out.

4 Claims, 19 Drawing Sheets

FIG. 2

| FIG. 3 |
| FIG. 4 |
| FIG. 5 |

FIG. 3

| READ ADDRESS | 1ST BYTE | 2ND BYTE | 3RD BYTE | 4TH BYTE | 5TH BYTE | 6TH BYTE | 7TH BYTE | DATA FOR PLAYING |
|---|---|---|---|---|---|---|---|---|
| 0000 | 90 | 40 | 6F | 00 | 60 | | | DATA FOR PLAYING INFORMATION |
| : | | | | | | | | |
| ①→ 000A | 90 | 42 | 5F | 00 | 09 | | | DATA FOR PLAYING INFORMATION |
| : | | | | | | | | |
| 0034 | F4 | 10 ④ | 01 | 02 ② | 1A | 02 | 30 | JUMP CONTROL DATA C-F4 (CONDITIONED BY ENRICHMENT FLAG=1) TO ④(RA(②)) |
| : | | | | | | | | |
| 004E | 90 | 41 | 3F | 00 | 60 | | | DATA FOR PLAYING INFORMATION |
| : | | | | | | | | |
| 00FF | F1 | 80 ⑧ | 01 | 00 | 04 | | | JUMP CONTROL DATA C-F1 (CONDITIONED BY PLAY END FLAG=1) TO ⑧ |
| : | | | | | | | | |
| ②→ 021A | 90 | 55 | 5F | 00 | 48 | | | DATA FOR PLAYING INFORMATION |
| : | | | | | | | | |
| 0220 | F4 | 20 ⑤ | 01 | 03 ③ | 5E | 00 | 07 | JUMP CONTROL DATA C-F4 (CONDITIONED BY ENRICHMENT FLAG=1) TO ⑤(RA(③)) |
| : | | | | | | | | |

MAIN PART

FIG. 4

| | | | | | | | |
|---|---|---|---|---|---|---|---|
| ③→ | 035E | 90 | 58 | 2E | 00 | 50 | | DATA FOR PLAYING INFORMATION |
| | : | | | | | | |
| | 04FF | F1 | 80 ⑧ | 01 | 00 | 48 | | JUMP CONTROL DATA C-F1 (CONDITIONED BY PLAY END FLAG=1) TO ⑧ |
| | : | | | | | | |
| | 06EE | 90 | 60 | 1E | 00 | 03 | | DATA FOR PLAYING INFORMATION |
| | : | | | | | | |
| | 0700 | F1 | 90 ⑨ | 01 | 00 | 00 | | JUMP CONTROL DATA C-F1 (CONDITIONED BY PLAY END FLAG=1) TO ⑨ |
| | 0705 | F3 | 00 ① | 0A | | | | JUMP CONTROL DATA C-F3 (INDEPENDENT OF FLAG) TO ① |
| | | | | | | | |
| ④→ | 1001 | 90 | 51 | 3F | 00 | 53 | | DATA FOR PLAYING INFORMATION |
| | : | | | | | | |
| | 100F | F3 | 30 ⑥ | 01 | | | | JUMP CONTROL DATA C-F3 (INDEPENDENT OF FLAG) TO ⑥ |
| | | | | | | | |
| ⑤→ | 2001 | 90 | 55 | 2E | 00 | 42 | | DATA FOR PLAYING INFORMATION |
| | : | | | | | | |
| | 200F | F3 | 30 ⑥ | 01 | | | | JUMP CONTROL DATA C-F3 (INDEPENDENT OF FLAG) TO ⑥ |

Right side labels: MAIN PART, INTER-MEDIATE PART, 1ST INTER-MEDIATE PART, 1ST INTER-MEDIATE PART

FIG. 5

| | | | | | | | | |
|---|---|---|---|---|---|---|---|---|
| ⑥→ | 3001 | 90 | 45 | 2E | 00 | 40 | | DATA FOR PLAYING INFORMATION |
| | : | | | | | | | |
| | 3100 | F2 | 40 ⑦ | 01 | 00 | 09 | | JUMP CONTROL DATA C-F2 (CONDITIONED BY ENRICHMENT FLAG=1) TO ⑦ |
| | : | | | | | | | |
| | 3F00 | F1 | 90 ⑨ | 01 | 00 | 00 | | JUMP CONTROL DATA C-F1 (CONDITIONED BY PLAY END FLAG=1) TO ⑨ |
| | 3F05 | F5 | | | | | | JUMP CONTROL DATA C-F5 TO ② OR ③(RA) |
| ⑦→ | 4001 | 90 | 45 | 2E | 00 | 40 | | DATA FOR PLAYING INFORMATION |
| | : | | | | | | | |
| | 401B | F3 | 30 ⑥ | 01 | | | | JUMP CONTROL DATA C-F3 (INDEPENDENT OF FLAG) TO ⑥ |
| ⑧→ | 8001 | 90 | 45 | 7F | 00 | 35 | | DATA FOR PLAYING INFORMATION |
| | : | | | | | | | |
| | 802F | FF | | | | | | END CONTROL DATA C-FF |
| ⑨→ | 9001 | 90 | 41 | 6F | 00 | 05 | | DATA FOR PLAYING INFORMATION |
| | : | | | | | | | |
| | 901F | FF | | | | | | END CONTROL DATA C-FF |

Right side brackets: BRIDGE PART; 2ND INTERMEDIATE PART; ENDING PART; ENDING PART

FIG. 6
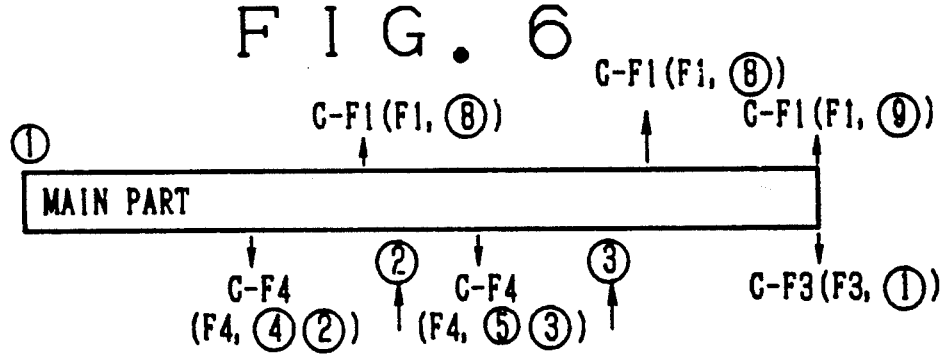
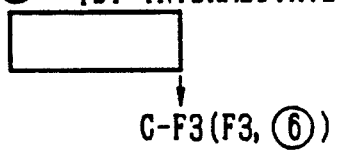
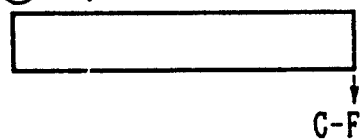
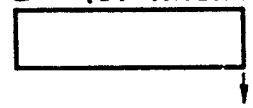

MODE 3

MODE 4

AUTOMATIC PLAYING APPARATUS

BACKGROUND OF THE INVENTION

1. Field of the Invention

The present invention relates to an automatic playing apparatus which has playing information storage means which has stored therein playing information including first tune information and a plurality of piece of second tune information related thereto, and playing information readout means whereby the playing information is read out from the playing information storage means in such an order that the first tune information is followed by one of the plurality of piece of second tune information.

2. Prior Art

In Japanese Pat. Pub. Disc. Gazette No. 177592/1989 there is disclosed an automatic playing apparatus which includes playing information storage means which has stored therein playing information composed of first tune information and a plurality of pieces of second tune information related thereto, playing information readout means whereby the playing information is read out from the playing information storage means in such an order that the first tune information is followed by one of the plurality of pieces of second tune information, and an actuator which is manipulated during read out of the first tune information of the playing information from the playing information storage means by the playing information readout means. In this instance, the actuator is made up of a plurality of actuators respectively corresponding to the plural pieces of second tune information of the playing information stored in the playing information storage means. If one of the actuators is held in the ON state in the course of reading out the first tune information of the playing information, then that one of the pieces of second tune information which corresponds to the manipulated actuator is read out of the playing information storage means by the readout means, regardless of the time point of manipulation of the actuator, after the first tune information of the playing information was wholly or partly read out of the playing information storage means by the playing information readout means.

In the case of such a conventional automatic playing apparatus, by manipulating a selected one of the plurality of actuators in the course of readout of the first tune information of the playing information from the playing information storage means by the playing information readout means, it is possible to selectively read out of the playing information storage means that one of the pieces of second tune information which corresponds to the actuator now selectively manipulated.

With such an arrangement, the playing information read out of the playing information storage means can be reproduced into a musical sound free from musical discontinuity between reproduced sounds of the first and second tune information.

With the conventional automatic playing apparatus, however, it is necessary to select, through manipulation by an operator, one of the plurality of actuators during the readout of the first tune information of the playing information from the playing information storage means so that the musical sound reproduced from the playing information read out of the storage means is free from musical discontinuity between reproduced sounds of the first and second tune information. In this instance, there is a fear of the operator choosing a wrong actuator, and if the wrong actuator is chosen, then the musical sound reproduced from the playing information read out of the storage means will contain musical discontinuity between reproduced sounds of the first and second tune information.

SUMMARY OF THE INVENTION

It is therefore an object of the present invention to provide a novel automatic playing apparatus which is free from the above-mentioned defect of the prior art.

The automatic playing apparatus according to a first aspect of the present invention includes, as is the case with the conventional automatic playing apparatus, playing information storage means which has stored therein playing information composed of first tune information and a plurality of pieces of second tune information related thereto, and playing information read out means whereby the playing information is readout of the playing information storage means in such an order of the first tune information being followed by one of the pieces of second tune information.

The automatic playing apparatus according to the first aspect of the present invention further includes playing information read control means whereby the playing information read means is controlled so that when the first tune information of the playing information has been read out of the playing information storage means to a selected one of a plurality of predetermined positions respectively corresponding to the plurality of peaces of second tune information, that one of the pieces of second tune information corresponding to the selected position is automatically read out of the playing information storage means.

The automatic playing apparatus according to a second aspect of the present invention includes, in addition to the construction of the apparatus according to the first aspect of the invention, a common actuator which is common to the plurality of pieces of second tune information and is manipulated in the course of reading out the first tune information from the playing information storage means by the read means, and the selected one of the plurality of predetermined positions on the first tune information is that one of the predetermined positions which is reached first after the manipulation of the common actuator in the course of reading out the first tune information by the read means.

The automatic playing apparatus according to a third aspect of the present invention also includes, as is the case with the conventional automatic playing apparatus, playing information storage means which has stored therein playing information composed of first tune information and second tune information related thereto, and playing information read means for reading out the playing information from the playing information storage means in such an order that the first tune information is followed by the second tune information.

In the automatic playing apparatus according to the third aspect of the present invention includes a plurality of pieces of third tune information related to the first and second tune information. The automatic playing apparatus further includes playing information read control means whereby the playing information read means is controlled so that when the first tune information has been read out of the playing information storage means to a selected one of a plurality of predetermined positions respectively corresponding to the plurality of pieces of third tune information, that one of the pieces of third tune information corresponding to the selected position is read out and then the second tune information is read out of the playing information storage means.

The automatic playing apparatus according to a fourth aspect of the present invention includes, in addition to the construction of the apparatus according to the third aspect of the invention, a common actuator which is common to the plurality of pieces of third tune information and is manipulated in the course of reading out the first tune information from the storage means by the read means, and the selected one of the plurality of predetermined positions on the first tune information is that one of the predetermined positions which is reached first after the manipulation of the common actuator in the course of reading out the first tune information by the read means.

With the automatic playing apparatus according to the first aspect of the present invention, the first tune information is read out to the afore-mentioned selected one of the plurality of predetermined positions respectively corresponding to the plurality of pieces of second tune information, after which that one of the pieces of second tune information corresponding to the selected position is automatically read out.

By suitably preselecting the plurality of predetermined positions on the first tune information, it is possible that musical sounds reproduced from the playing information read out by the playing information read means are obtained without any discontinuity between reproduced sounds of the first tune information and second tune information.

Thus, the automatic playing apparatus according to the first aspect of the present invention also permits reproducing the playing information read out by the read means into musical sounds with no discontinuity between reproduced sounds of the first tune information and the second tune information.

The automatic playing apparatus according to the first aspect of the present invention precludes the necessity of selecting one of plurality of actuators by an operator as in the prior art and hence eliminates the possibility of the operator selecting a wrong actuator. Consequently, there is no likelihood of the musical sounds reproduced from the playing information read out of the storage means being accompanied by discontinuity between the reproduced sounds of the first tune information and the second tune information.

With the automatic playing apparatus according to the second aspect of the present invention, when the common actuator is manipulated in the course of reading out the first tune information by the read means, the first tune information is read to that one of the plurality of predetermined positions on the first tune information which is reached first after manipulation of the common actuator, and then that one of the pieces of second tune information corresponding to the above-mentioned predetermined position is automatically read out.

Thus, the automatic playing apparatus according to the second aspect of the present invention produces the same effect as is obtainable with the apparatus according to the first aspect of the invention, except that selected one of the predetermined positions to which the first tune information is read is specified by the manipulation of the common actuator.

With the automatic playing apparatus according to the third aspect of the present invention, the first tune information is read out, by the playing information read means placed under control of the control means, to the afore-mentioned selected one of the plurality of predetermined positions respectively corresponding to the plurality of pieces of third tune information, after which that one of the pieces of third tune information corresponding to the selected predetermined position is automatically read out and than the second tune information is automatically read out.

With such an arrangement, by suitably preselecting the plurality of predetermined positions on the first tune information, musical sounds reproduced from the playing information read out by the playing information read means can be obtained with no discontinuity between reproduced sounds of the first tune information and the third tune information and between reproduced sounds of the third tune information and the second tune information, even in the case where only the first tune information and the second tune information are successively read out by the playing information read means and their reproduced sounds are accompanied by discontinuity between them.

In the case of the automatic playing apparatus according to the third aspect of the present invention, one of the plurality of pieces of third tune information is selectively read out only by the manipulation of the actuator common to all the pieces of third tune information as in the case of the apparatus according to the first aspect of the invention. This precludes the necessity of selecting one of a plurality of actuators by an operator as in the prior art and hence eliminates the possibility of the operator selecting a wrong actuator. Consequently, there is no likelihood of the musical sounds reproduced from the playing information read out by the read means being accompanied by discontinuity between the reproduced sounds of the first tune information and the second tune information and between the reproduced sounds of the third tune information and the second tune information.

With the automatic playing apparatus according to the fourth aspect of the present invention, as in the case of the apparatus according to the second aspect of the invention, when the common actuator is manipulated in the course of reading out the first tune information by the read means, the first tune information is read to that one of the plurality of predetermined positions on the first tune information which is reached first after manipulation of the common actuator, and then that one of the pieces of third tune information corresponding to the above-mentioned predetermined position is automatically read out and the second tune information is read out.

Thus, the automatic playing apparatus according to the fourth aspect of the present invention produces the same effect as is obtainable with the apparatus according to the third aspect of the invention, except that selected one of the predetermined positions to which the first tune information is read is specified by the manipulation of the common actuator.

Other objects, features and advantages of the present invention will become more apparent from the following description taken in conjunction with the accompanying drawings.

BRIEF DESCRIPTION OF THE DRAWINGS

FIG. 2 shows FIGS. 3, 4 and 5;

Figures 2, 3, 4, 5:
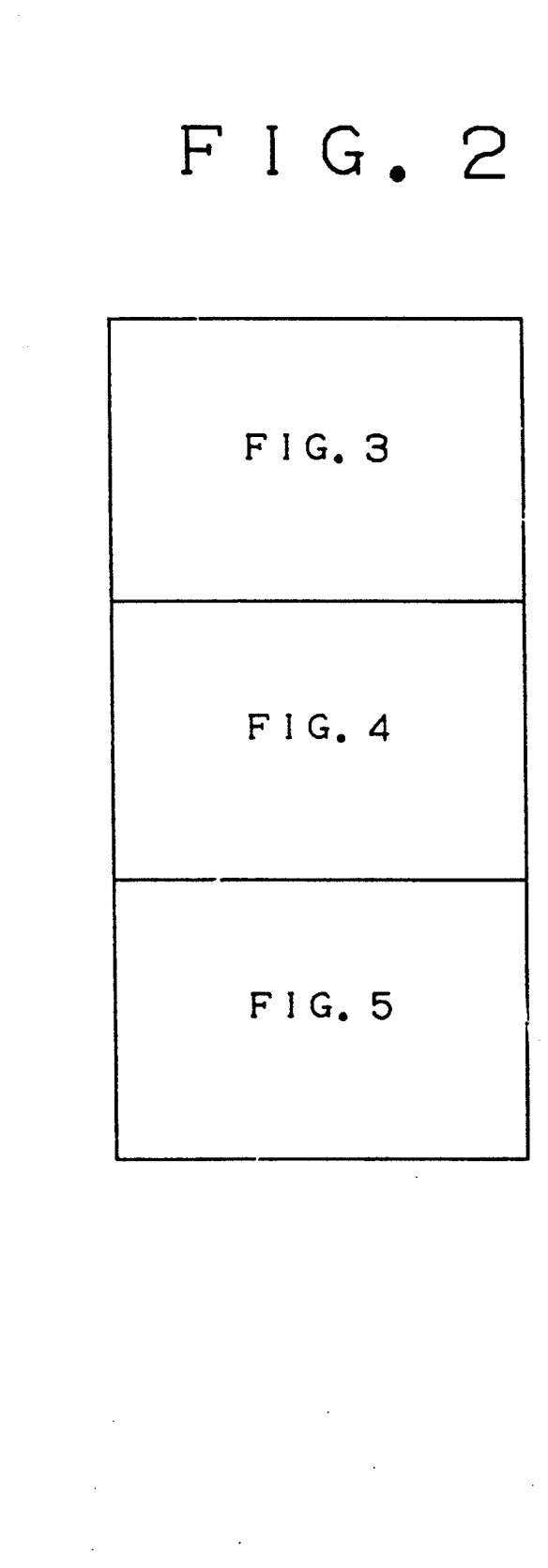

FIGS. 3, 4 and 5 are diagrams showing the relationship between example of data for playing information and control data stored in a playing data memory and readout addresses in the memory, for explaining the first embodiment depicted in FIG. 1;

FIG. 6 is a diagram for explaining the operation of the first embodiment shown in FIG. 1;

DESCRIPTION OF THE PREFERRED EMBODIMENT

Embodiment 1

Figure 1:
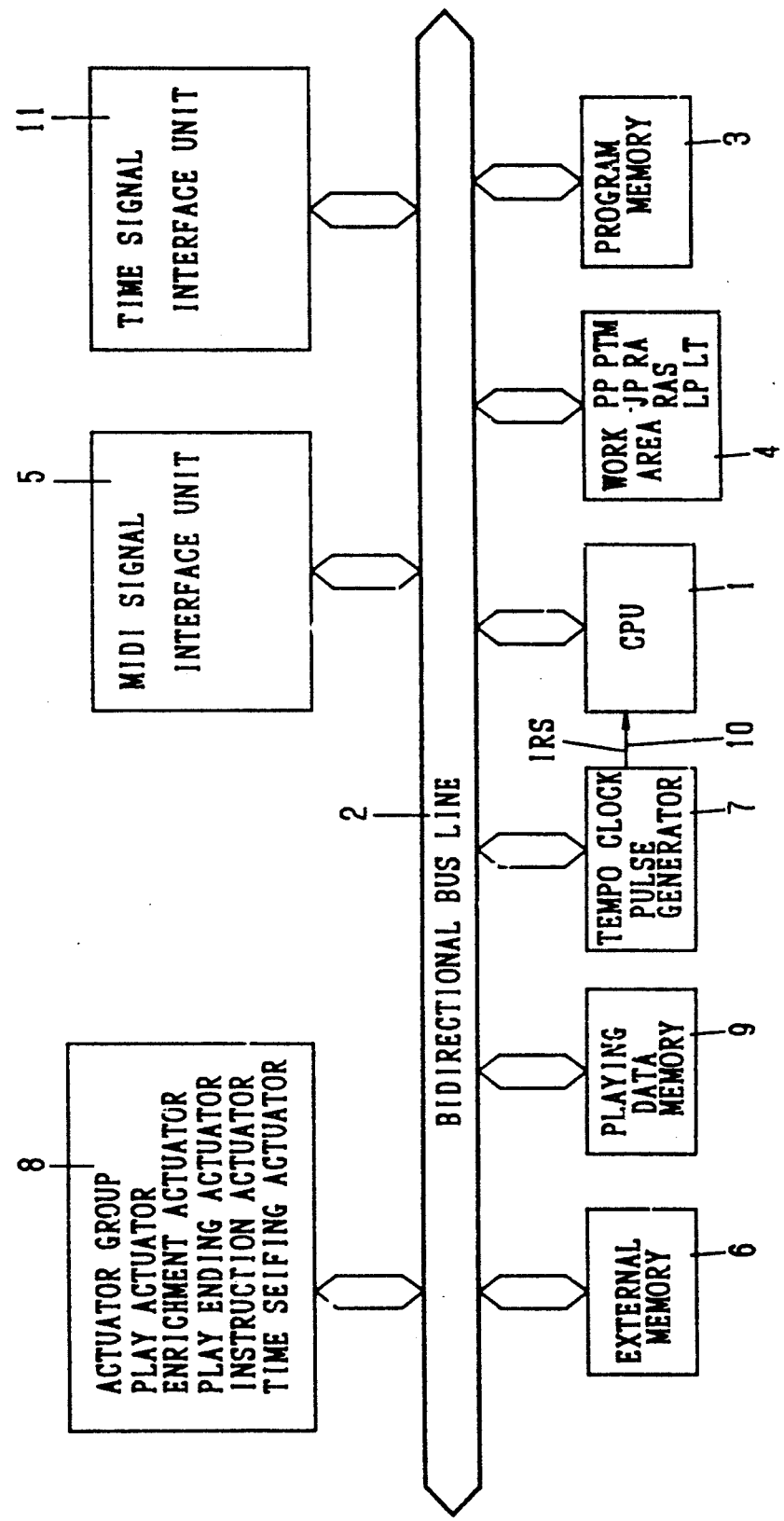
FIG. 1 is a block diagram schematically illustrating a first embodiment of the present invention.
Figure 7:
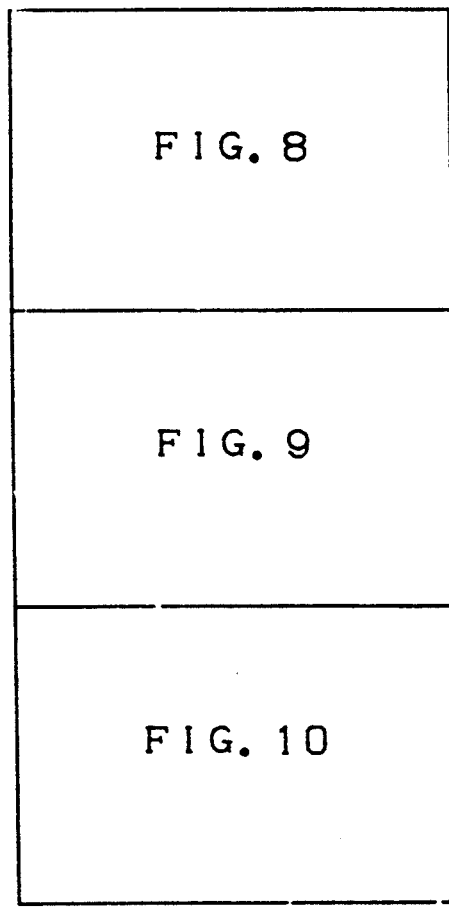
FIG. 7 shows FIGS. 8, 9 and 10.
Figure 8:
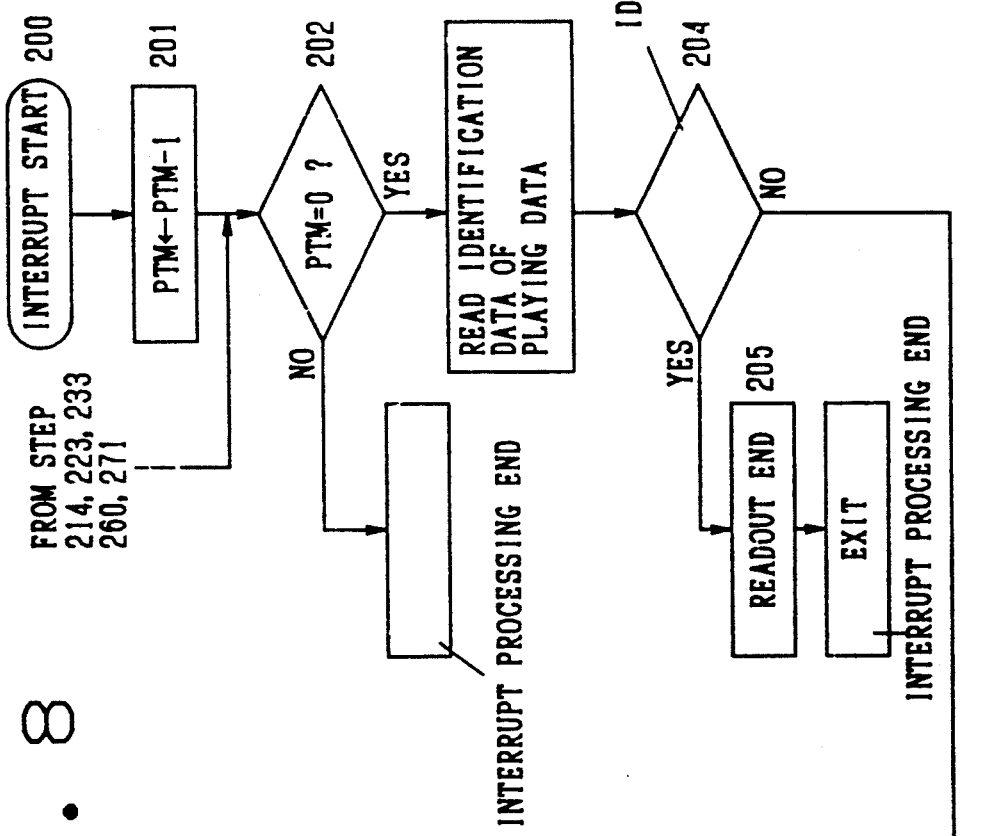
FIGS. 8, 9 and 10 are diagrams showing the flow of processing in the first embodiment depicted in FIG. 1.
Figure 9:
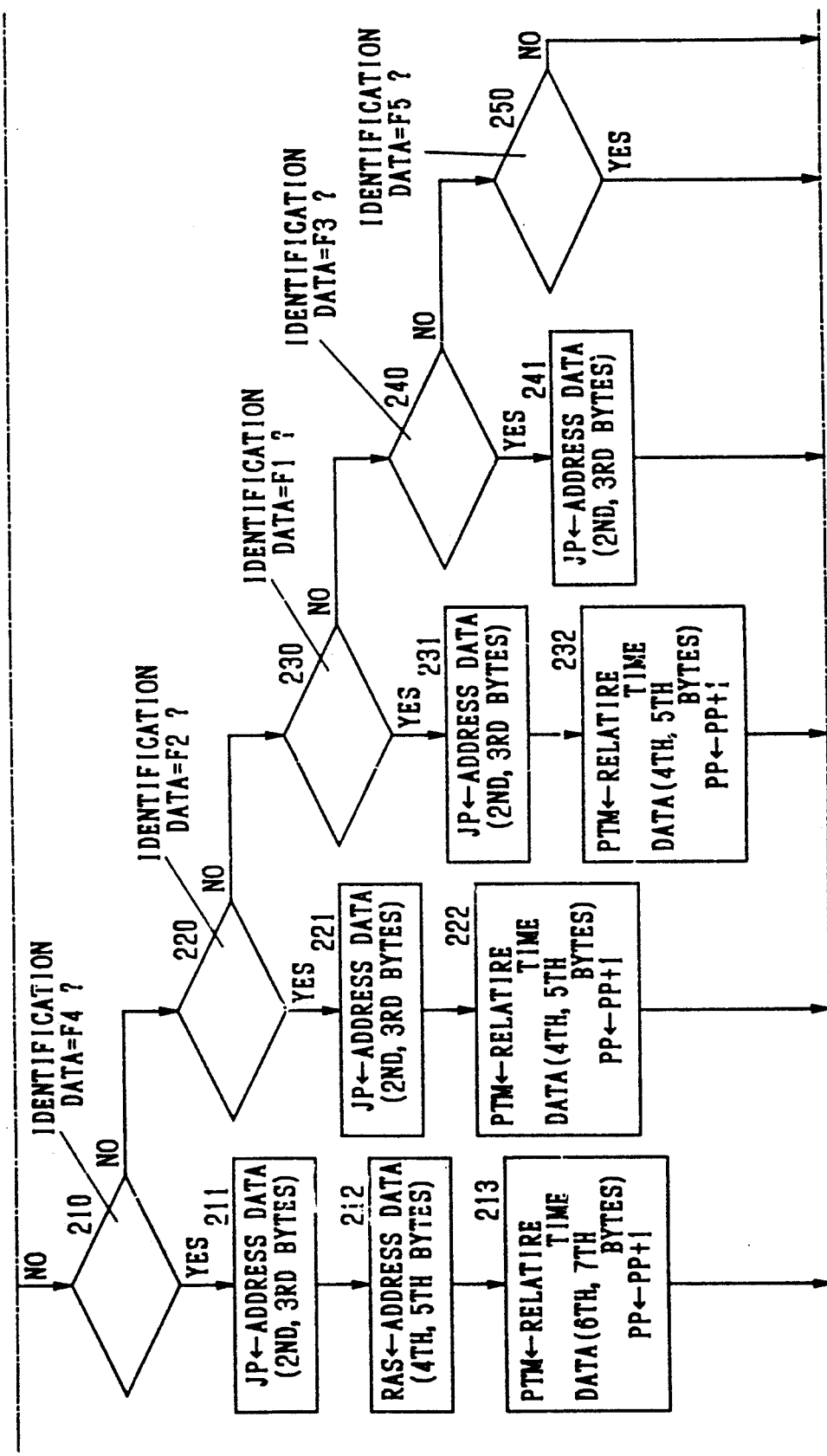
Figure 10:
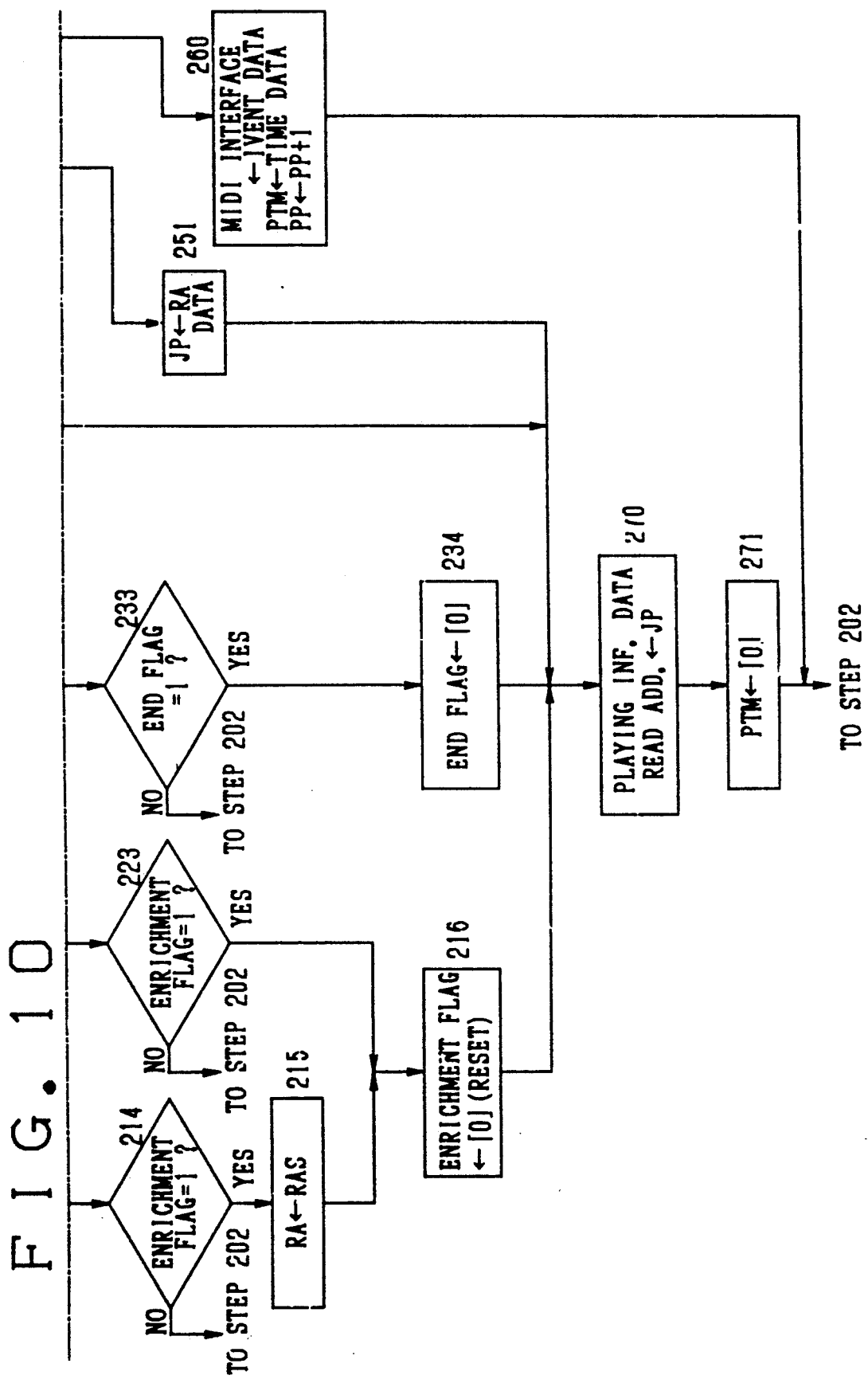

Referring first to FIG. 1, an embodiment of the automatic playing apparatus according to the present invention will be described.

The automatic playing apparatus shown in FIG. 1 is formed by a computer as described below.

The automatic playing apparatus has a central processing unit (hereinafter referred to as the CPU) 1 forming a known computer and includes a program memory 3, a work area 4, an MIDI signal interface unit 5, an external memory 6, a tempo clock pulse generator 7, an actuator group 8, a playing data memory 9 and a time signal interface unit 11 which are all connected to the CPU 1 via a bi directional bus line 2.

A description will be given of the construction and function of each of the program memory 3, the work area 4, the MIDI signal interface unit 5, the external memory 6, the tempo clock pulse generator 7, the actuator group 8, the playing data memory 9 and the time signal interface unit 11.

Program Memory 3

The memory 3 is formed by, for example, a read only memory (ROM) and has stored therein control program for the CPU 1. The control program is composed of a main processing program which performs initialization upon connection of the power supply to the CPU 1 and detects the ON or OFF state of each actuator of the actuator group 8 and causes the CPU 1 to perform main processing corresponding to the detected state of the actuator and an interrupt processing program which interrupts the main processing program and causes the CPU 1 to perform interrupt processing.

The processing by the CPU 1 under control of the interrupt processing program is to read out of the playing data memory 9 playing data containing relative time data upon each generation of an interrupt signal IRS from the tempo clock pulse generator 7 as described later on.

In the interrupt processing the value of relative time data register PTM in the work area 4 is decremented from the value of time represented by the relative time data of the playing data for each interruption as described later on. When the value of the relative time data register PTM has been decremented to "0", new playing data is read out of the playing data memory 9.

When the playing data thus read out is data for playing information as described later, its event data is applied as an MIDI signal to the MIDI signal interface unit 5. Thus, event data of data for playing information stored in the playing data memory 9 is provided as the MIDI signal to the MIDI signal interface unit 5 at intervals of the time necessary for performing the interrupt processing a number of times corresponding to the relative time data. When the playing data read out of the playing data memory 9 is control data described later on, processing is performed by which, for example, the content of address data for reading out the playing data memory 9 is modified.

Work Area 4

The work area 4 is formed, for example, by a random access memory (RAM), a read address data register PP for temporarily storing address data for reading out the playing data memory 9, the relative time data register PTM for temporarily storing data on the relative time interval between adjacent pieces of playing data, first, second and third jump address data registers RA, JP and RAS, a loop number data register LP for temporarily storing loop number data representing how many times a sequence of playing data can be repeated, and a bar number data register LT for temporarily storing bar number data representing the bar number counted from the beginning of the playing data.

MIDI Signal Interface Unit 5

The MIDI signal interface unit 5 converts the event data of data for playing information composed of parallel data, supplied from the CPU 1, into event data composed of serial data based on the MIDI standard and outputs the event data as the MIDI signal to the outside.

External Memory 6

The external memory 6 is formed by a magnetic recording medium, IC card, or the like and stores the playing data delivered from the playing data memory 9.

Tempo Clock Pulse Generator 7

The tempo clock pulse generator 7 generates tempo clock pulses at time intervals corresponding to, for example, 1/96 of one beat (i.e. one quarter note) at the time of readout (or playback) of the playing data from the playing data memory 9 and, upon each generation of the tempo clock pulse, generates and applies the interrupt signal IRS to the CPU 1 via an interrupt line 10.

Actuator Group 8

The actuator group 8 includes, in addition to a play actuator for initiating the readout of the data for playing information, a play ending actuator whereby the readout of data for main part playing information or data for bridge part playing information forming playing information data described later on is switched to the readout of data for ending part playing information forming playing information data, an enrichment actuator whereby the readout of the data for bridge part playing information is interrupted and the data is read out again from the beginning so as to switch the readout of the data for main part playing information to the readout of the data for bridge part playing information, an instruction actuator for instructing the enrichment actuator or the loop number data stored in the register LP and the bar number data stored in the register LT is used for obtaining the operation in the case of using the enrichment actuator, and a time setting actuator for setting the time to read out the playing data. A manual or pedal switch may be used as each of such actuators.

In response to the manipulation of the play ending actuator and the enrichment actuator the automatic playing apparatus depicted in FIG. 1 operates as follows: Upon turning-ON of the play ending actuator, a play terminating flag provided in the CPU 1 is set to "1" in binary under control of the control program for the CPU 1.

Upon turning-ON of the enrichment actuator, an enrichment flag is similarly set to "1" in binary under control of the control program for the CPU 1. In this instance, however, when either one of the two flags is "1", it is detected by the CPU 1 and the other flag is set to "0" by the detected output; consequently, the two flags will not be set to "1" at the same time. Incidentally, the states of these flags are indicated by lighting pilot lamps therefor.

Incidentally, the instruction actuator is not used in this embodiment, but when the use of the enrichment actuator has been instructed by the instruction actuator, an instruction flag is set to "1" in binary notation, based on the control program for the CPU 1, and when the use of the loop number data and the bar number data has been instructed, the instruction flag is set to "0" in binary notation.

Playing Data Memory 9

The playing data memory 9 is formed by a random access memory (RAM), for example, and has stored therein, as playing data, data for playing information and control data addressed by read address data of two bytes.

FIGS. 2 to 5 show, by way of example, the arrangement of the data for playing information and control data of the playing data on the read addresses where they are stored. The contents of the playing data are given in hexadecimal.

Data for Playing Information

The data for playing information includes event data of three bytes at first, second and third byte positions according to the MIDI standard and relative time data of two bytes at fourth and fifth byte positions which follow the event data and represent the time to the next event, using as the unit the cycle of the tempo clock pulses available from the tempo clock pulse generator 7.

The three-byte event data forming the data for playing information is composed of identification data indicating the type of an event and a MIDI channel at first and second bit positions of the first byte, respectively, one-byte key number display data at the second byte position and one-byte data for initial touch information at the third byte position.

As shown in FIG. 6, the data for playing information includes: data for main part playing information composed of data for main playing information; data for bridge part playing information composed of data for playing information which enriches the playing of a tune; a plurality of pieces of data for first intermediate or linkage part playing information composed of data playing information which links the data for main part playing information to the data for bridge part playing information; data for second intermediate part playing information composed of data for playing information which links the data for bridge part playing information to the same data for bridge part playing information; and data for ending part playing information.

Control Data

The control data includes end control data C-FF and jump control data C-F1, C-F2, C-F3, C-F4 and C-F5 described below.

End Control Data C-FF

The end control data C-FF is composed only of one-byte identification data at the first byte position and terminates the readout of data for playing information.

Jump Control Data C-F1

The jump control data C-F1 is composed of one-byte identification data F1 at the first byte position, a two-byte jump address data at the second and third byte positions and two-byte relative time data at the fourth and fifth byte positions and causes a jump from the state of reading out the data for main part playing information or data for bridge part playing information included in the data for playing information to the state of reading out the data for ending part playing information on the condition that the play terminating flag is "1".

Jump Control Data C-F2

The jump control data C-F2 is composed of one-byte identification data F2 at the first byte position, two-byte jump address data at the second and third byte position and two-byte relative time data at the fourth and fifth byte positions and causes a jump from the state of reading out the data for bridge part playing information to the state of reading out again the same data pr from the state of reading out the data for main part playing information to the state of reading out the same data again on the condition that the enrichment flag is "1".

Jump Control Data C-F3

The jump control data C-F3 is composed of one-byte identification data F3 at the first type position and jump address data at the second and third byte positions and causes a jump from the state of reading out the data for main part playing information to the stage of reading out the same data again or from the state of reading out the data of first or second intermediate part playing information to the state of reading out the data for bridge part playing information in accordance with the jump address specified by the jump address data.

Jump Control Data C-F4

The jump control data C-F4 is composed of one-byte identification data F4 at the first byte position, two-byte first jump address data at the second and third byte positions, second jump address data at the fourth and fifth byte positions and two-byte relative time data at sixth and seventh byte positions. On the condition that the enrichment flag is up or "1", the jump control data C-F4 causes a jump from the state of reading out the data for main part playing information to the state of reading out the date of first or second intermediate part playing information and thence to the state of reading out the data for bridge part playing information, followed by the state of reading out the data for main part playing information.

Jump Control Data C-F5

The jump control data C-F5 is composed only of one-byte identification data at the first byte and causes a jump from the state of reading out the date for bridge part playing information to the state of reading out the data for main part playing information.

Time signal Interface Unit 11

The time signal interface unit 11 applies an external time signal to the CPU 1.

Relationships of Read Address to Data for Playing Information and Control Data A description will be given, with reference to FIG. 6, of the relationships between the above-mentioned data for playing information and control data stored in the memory 9 and its read address.

As a read address following that of the data for playing information at the end of the data for main part playing information the jump control data C-F3 is stored whose identification data has the contents "F3" and whose jump address data has the contents for a jump to the readout of the data for playing information at the read address (1) (000A) in the data for main part playing information.

At a read address following the first read address of the data for main part playing information which seems to be switchable to the readout of the data for bridge part playing information, the jump control data C-F4 is stored whose identification data has the contents "F4", whose first jump address data has the contents for a jump to the readout of the data for playing information at the read address (4) (1001) in the data for first linkage part playing information and whose second jump address data has the contents for a jump to the readout of the data for playing information at the read address (2) (021A) in the data for main part playing information. Further, at a read address following the second read address of the data for playing information another jump control data C-F4 is stored whose identification data has the contents "F4", whose first jump address data has the contents for a jump to the readout of the data for playing information at the read address 5 (2001) in the data for first linkage part playing information and whose second jump address data has the contents for a jump to the readout of the data for playing information at the read address (3) (035E) in the data for main part playing information.

Moreover, at a read address following that of the data for playing information at the end of each data for first, second and third linkage parts playing information, the jump control data C-F3 is stored whose identification data has the contents "F3" and whose jump address data has the contents for a jump to the readout of the data for playing information at the read address (6) (3001) in the data for bridge part playing information.

At a read address following the read address of the data for playing information at the end of the data for bridge part playing information, the jump control data C-F5 is stored whose identification data has the contents "F5".

A read address following the first and second read addresses of the data for main part playing information which seems to be switchable to the readout of the data for ending part playing information, the jump control data C-F1 is stored whose identification data has the contents "F1" and whose jump address data has the contents for a jump to the readout of the data for playing information at the read address (8) (8001) in the data for ending part playing information, and at the third read address of the data for playing information, the jump control data C-F1 is stored whose identification data has the contents "F1" and whose jump address data has the contents for a jump to the readout of the data for playing information at the read address (9) (9001) in the data for ending part playing information.

Example of Operation

Turning next to FIGS. 7 to 10, an example of the operation of the FIG. 1 embodiment will be described.

Start of Interrupt Processing

Interrupt processing starts in step 200.

In step 201 the value of the relative time data register PTM, which represents the time from the readout of a certain piece of playing data to the readout of the next piece of playing data in the playing data memory 9, is decremented by one.

In the next step 202 the value of the relative time data register PTM is checked, and if not "0", the interrupt processing comes to an end.

Since the value "0" of the relative time data register PTM means that the timing of reading out playing data from the Playing data memory 9 has been reached, the identification data at the first byte position of the playing data, represented by address data of the read address data register PP, is read out in step 203.

In the next step 204 it is checked whether the identification data thus read out has the contents "FF" indicating the end control data C-FF. If so, processing for terminating the readout of the playing data, such as inhibiting the interrupt processing, is performed in step 205, thus finishing the interrupt processing.

When the Identification Data is not "FF"

In this instance, the process proceeds to step 210, in which it is checked whether the identification data is "F4" indicating the jump control data C-F4. If so, the process proceeds to step 211, wherein the jump address data at the second and third byte positions following the first byte position where the identification data is stored is read out from the jump control data C-F4 and is set in a jump address data register JP as jump address data for a jump to the readout of the data for bridge part playing information. Further, in step 212 the jump address data at the fourth and fifth byte positions of the jump control data C-F4 is read out and set in a third jump address data register RAS as jump address data for a jump from the readout of the above-mentioned data for bridge part playing information to the readout of data for playing information on a different part.

In step 213 the relative time data at the sixth and seventh byte positions of the jump control data C-F4 is read out and set in the relative time data register PTM and the read address data register PP is incremented one by one, permitting the readout of the identification data at the first byte position of the next playing data.

In the next step 214 it is checked whether the enrichment flag, which indicates whether the progress to the readout of the data for bridge part playing information has been instructed by the enrichment actuator, is up or "1". If the flag is down or "0", it means that the progress to the readout of the data for bridge part playing information has not been instructed, and then the process proceeds to step 202.

When the flag is up or "1", the process proceeds to step 215, wherein the value of the first jump address data register RA is updated with the value of the third jump address data register RAS. After this, the enrichment flag is reset to "0" in step 216, the contents of the read address data for playing data are changed to the value of the second jump address register JP in step 270 and the relative time data "0" is set in the relative time data register PTM in the step 271, after which the process proceeds to step 202.

Thus, when the jump control data C-F4 has been detected, the read address data for playing data is updated with the jump address data under the condition that the enrichment actuator has been turned ON. That is, the read address in the playing data memory 9 is changed. This also means that the jump address data has been set in the first jump address register RA in preparation for a jump by the jump control data C-F5 from the readout of the data for bridge part playing information to the readout of different data for playing information.

When the identification data is not "F4"

If it is determined in step 210 that the identification data is not "F4" indicating the jump control data C-F4, then the process proceeds to step 220.

In step 220 it is checked whether the identification data read out in step 203 is "F2" which indicates the jump control data C-F2. If so, the process proceeds to step 221, wherein the jump address data at the second and third byte positions of the jump address data C-F2 is read out and set in the jump address data register JP. Then, the process proceeds to step 222, wherein the relative time data at the fourth and fifth byte positions of the jump control data C-F2 is read out and set in the relative time data register PTM and the address data register PP is incremented or decremented one by one, permitting the readout of the identification data at the first byte position of the next playing data.

In the next step 223 it is checked whether the enrichment flag, which indicates whether the progress to the readout of the data for bridge part playing information has been instructed by turning ON the enrichment actuator, is up or "1". If the flag is down or "0", it means that the progress to the readout of the data for bridge part playing information has not been instructed, and then the process proceeds to step 202.

When the flag is up or "1", the flag is reset to "0" in step 234, the contents of the read address for the playing data are changed to the value of the jump address register JP in step 270 and the relative time data "0" is set in the relative time data register PTM in step 271, after which the process proceeds to step 202.

Thus, when the jump control data C-F2 for a jump to the readout of the data for bridge part playing information has been detected, the read address data for playing information is updated to the contents of the jump address data under the condition that the enrichment actuator has been turned ON, and this means that the read address in the playing data memory 9 has been changed.

When the identification data is not "F2"

When it has been determined in step 220 that the identification data is not "F2" which indicates the jump control data C-F2, the process proceeds to step 230.

In step 230 it is checked whether the identification data read out in step 203 is "F1" which indicates the jump control data C-F1 for a jump to the readout of the data for ending part playing information. If so, the process proceeds to step 231, wherein the jump address data at the second and third byte positions following the first byte position where the identification data is stored is read out from the jump control data C-F1 and is set in the jump address data register JP. Then, in the next step 232 the relative time data at the fourth and fifth byte positions of the jump control data C-F1 is read out and set in the relative time data register PTM and the read address data register PP is incremented or decremented one by one to thereby permit the readout of the identification data at the first byte position of the next playing data.

Next, it is checked in step 233 whether the play end flag, which indicates whether the progress to the readout of the data for ending part playing information has been instructed by turning ON the play ending actuator, is up or "1". If the flag is down or "0", it means that the progress to the readout of the data for ending part playing information has not been instructed, and then the process proceeds to step 202.

When the flag is up or "1", the playing end flag is reset to "0" in step 234, the contents of the playing data read address are changed to the value of the jump address register JP in step 270 and the relative time data "0" is set in the relative time data register PTM in step 271, after which the process proceeds to step 202.

Thus, when the jump control data C-F2 for a jump to the readout of the data for ending part playing information has been detected, the contents of the read address for the data for playing information are updated to the jump address data under condition that the play ending actuator has been turned ON, and this means that the read address in the playing data memory 9 has been changed.

When the identification data is not "F1"

When it has been determined in step 230 that the identification data is not "F1" which indicates the jump control data C-F1, the process proceeds to step 240.

In step 240 it is checked whether the identification data read out in step 203 is "F3" which represents the jump control data C-F3. If so, the jump address data at the second and third byte positions of the jump control data C-F3 is read and set in the jump address data register JP in step 241, the contents of the playing data read address are changed to the value of the jump address data register JP in step 270 and then the relative time data "0" is set in the relative time data register PTM in step 271, after which the process proceeds to step 202.

Thus, when the jump control data C-F3 has been detected, the contents of the playing data read address are updated to the contents of the jump address, and this means that the read address in the playing data memory 9 has been changed.

When the identification data is not "F3"

When it has been determined in step 240 that the identification data for the playing data is not "F3", the process proceeds to step 250.

In step 250 it is checked whether the identification data read out in step 203 is "F3" which represents the jump control data C-F5. If so, the preset value of the jump address data register RA is set as a jump address in the jump address data register JP in step 251, the contents of the playing information read address data are changed to the value of the jump address data register JP in step 270 and then the relative time data "0" is set in the relative time data register PTM, after which the process proceeds to step 202.

Thus, when the jump control data C-F5 has been detected in the course of reading out the data for bridge part playing information, the contents of the playing information read address data are updated to the contents of the jump address data prespecified by the jump address data register RA, this means that the read address in the playing data memory 9 has been changed.

Incidentally, the jump address data register RA is set when a jump to the readout of the data for bridge part playing information is caused by the jump control data C-F4.

When the identification data is not "F5"

The determination, in step 250, that the identification data is not "F5" means that the identification data read out in step 203 does not indicate the end control data C-FF or any of the jump control data C-F1 to C-F5, and hence the determination means that the play data is an MIDI signal to be output via the MIDI signal interface unit 5.

In the case where it has been determined in step 250 that the identification data is not "F5" which represents the jump control data C-F5, the process proceeds to step 260, wherein the type of the MIDI event of the data for playing information is determined, based on the contents of the identification data and five-byte data composed of three-byte event data and two-byte relative time data is read out.

The three-byte event data is provided to the MIDI signal interface unit 5, the two-byte relative time data is set in the relative time data register PTM, and the read address data register PP is incremented one by one, permitting the read of the identification data at the first byte position of the next playing data.

Concrete Examples of Operation

Next, a description will be given, with reference to FIGS. 11 to 15, of concrete modes in which data for playing information is read out from the memory 9, based on the above-described control data.

Figure 11:
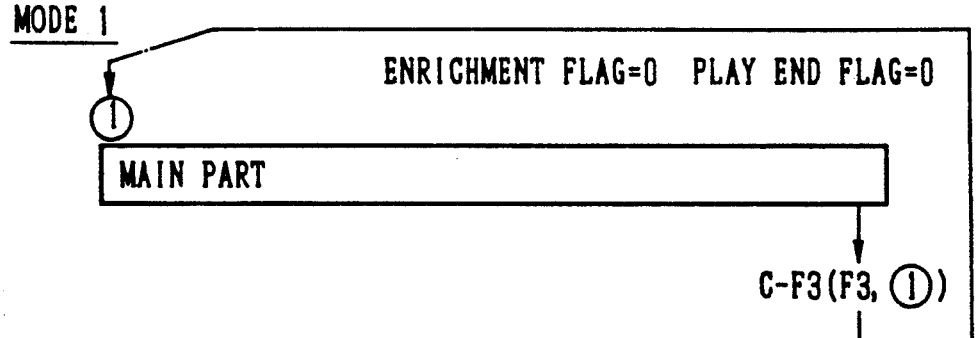
FIGS. 11, 12, 13, 14 and 15 are diagrams for explaining concrete examples of operation of the first embodiment of the present invention.

Mode 1: Where neither of the enrichment actuator and the ending actuator is ON in the course of reading out the data for main part playing information:

In this instance, the data for main part playing information is read out again at and subsequent to the position of an address (1), based on the jump control data C-F3 which is read out first after the readout of the data for main part playing information, as shown in FIG. 11.

Figure 12:
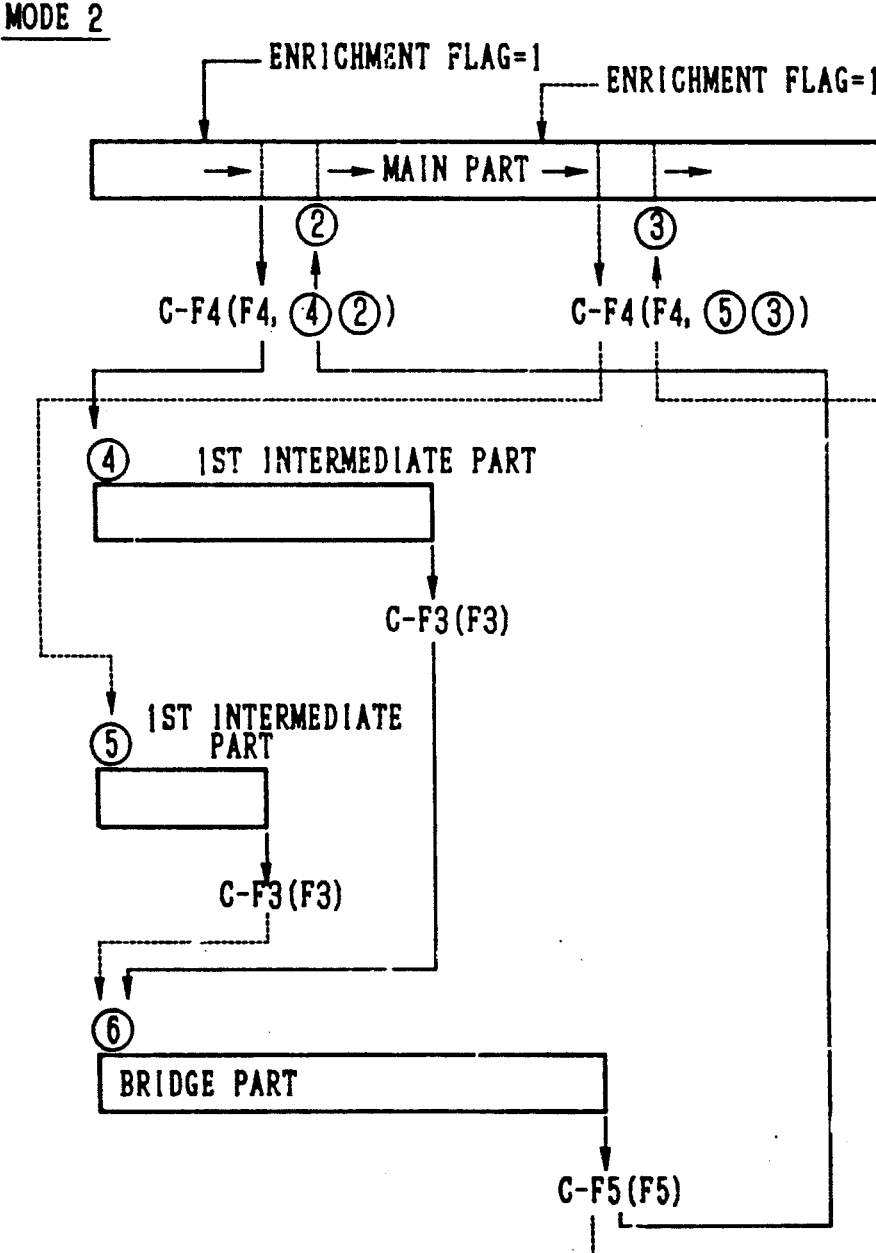

Mode 2: where the enrichment actuator is turned ON in the course of reading out the data for main Part playing information:

In this instance, as shown in FIG. 12, upon detection of the ON state of the enrichment actuator, the operation proceeds to the position of a read address (4) or (5) of the data for playing information which is read at the beginning of the data for the first intermediate or linkage part playing information which links the readout of the data for main part playing information to the readout of the data for bridge part playing information, based on the jump control data C-F4 for jumping to the readout of the data for bridge part playing information. At this time, a read address (2) or (3) is set in the first jump address data register RA.

After the data for the first intermediate or linkage part playing information is read out, the operation proceeds to the position of an address (6) of the data for playing information which is read at the beginning of the data for bridge part playing information, based on the jump control data C-F3 which is read first after the readout of the data for the linkage part playing information.

After the data for bridge part playing information is read out, the operation proceeds to the position of the address (2) or (3) of the data for main part playing information which has been stored in the jump address data register RA, based on the jump control data C-F5 at an address next to the read address of the data for playing information which is read at the end of the data for bridge part playing information.

Figure 13:
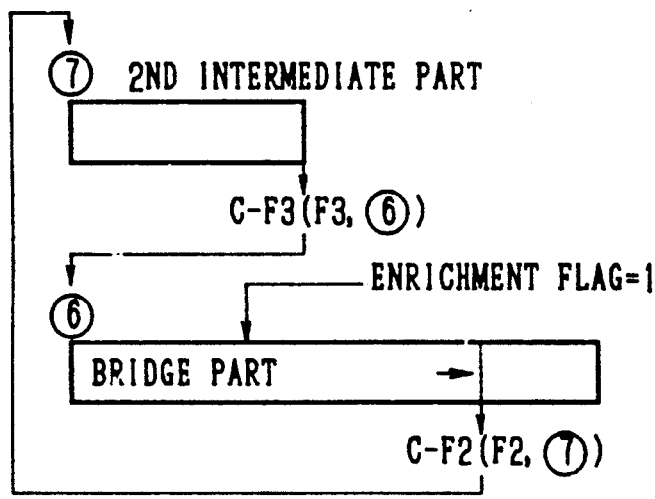

Mode 3: Where the enrichment actuator is turned ON in the course of reading out the data for bridge part playing information:

In this instance, as shown in FIG. 13, upon detection of the jump control data C-F2 for a jump to the readout of the data for bridge part playing information after turning ON of the enrichment actuator, the operation proceeds to the position of an address (7) of the data for playing information which is read at the beginning of the data for the second intermediate or linkage part playing information for reading again the data of bridge playing information. At this time, no jump address data is set in the jump address data register RA.

After the data for the second linkage part playing information is read, the operation proceeds to the address (6) of the data for playing information which is read at the beginning of the data for bridge part playing information, based on the jump control data C-F3 at read address next to that of the data for playing information which is read at the end of the data for the second bridge part playing information.

Figure 14:
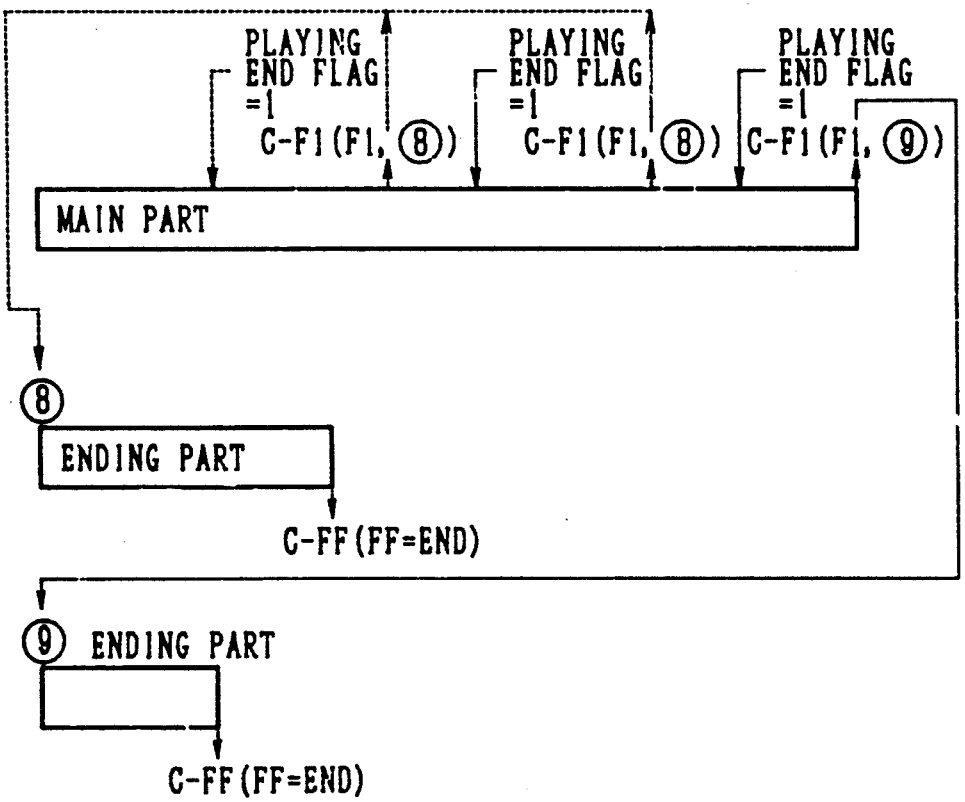

Mode 4: Where the play ending actuator is turned ON in the course of reading out the data for main part playing information:

In this instance, as shown in FIG. 14, upon detection of the jump control data C-F1 for a jump to the readout of the data for ending part playing information after turning ON of the play ending actuator, the operation proceeds to the position of an address (8) or (9) of the data for playing information which is read at the beginning of the data for ending part playing information.

If the end control data C-FF is detected after the readout of the data for ending part playing information, then the readout operation comes to an end.

Figure 15:
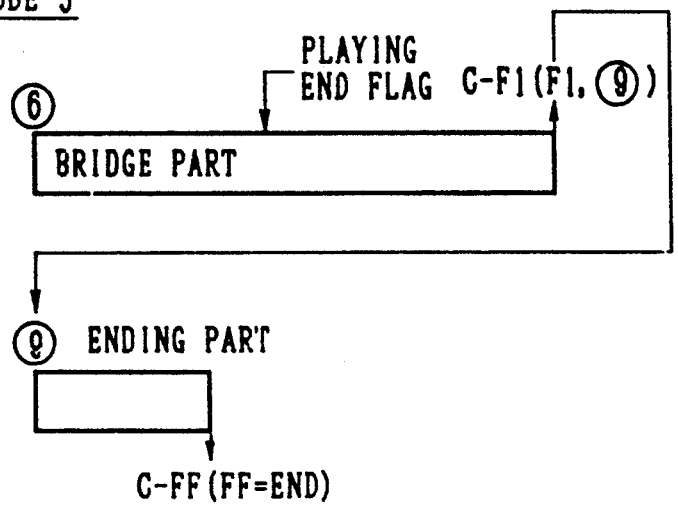

Mode 5: Where the play ending actuator is turned ON in the course of reading out the data for bridge part playing information:

In this instance, as shown in FIG. 15, upon detection of the jump control data C-F1 for a jump to the readout of the data for ending part playing information after turning ON of the play ending actuator, the operation proceeds to the position of the address 9 which is read at the beginning of the data for ending part playing information.

In the end control data C-FF is detected after the readout of the data for ending part playing information, then the readout operation comes to an end.

Embodiment 2

Next, a description will be given of a second embodiment of the present invention.

This embodiment is identical in construction with the first embodiment described previously and hence will be described using the same reference numerals as shown in FIG. 1, and for the sake of brevity, no detailed description will be repeated.

Figure 16:
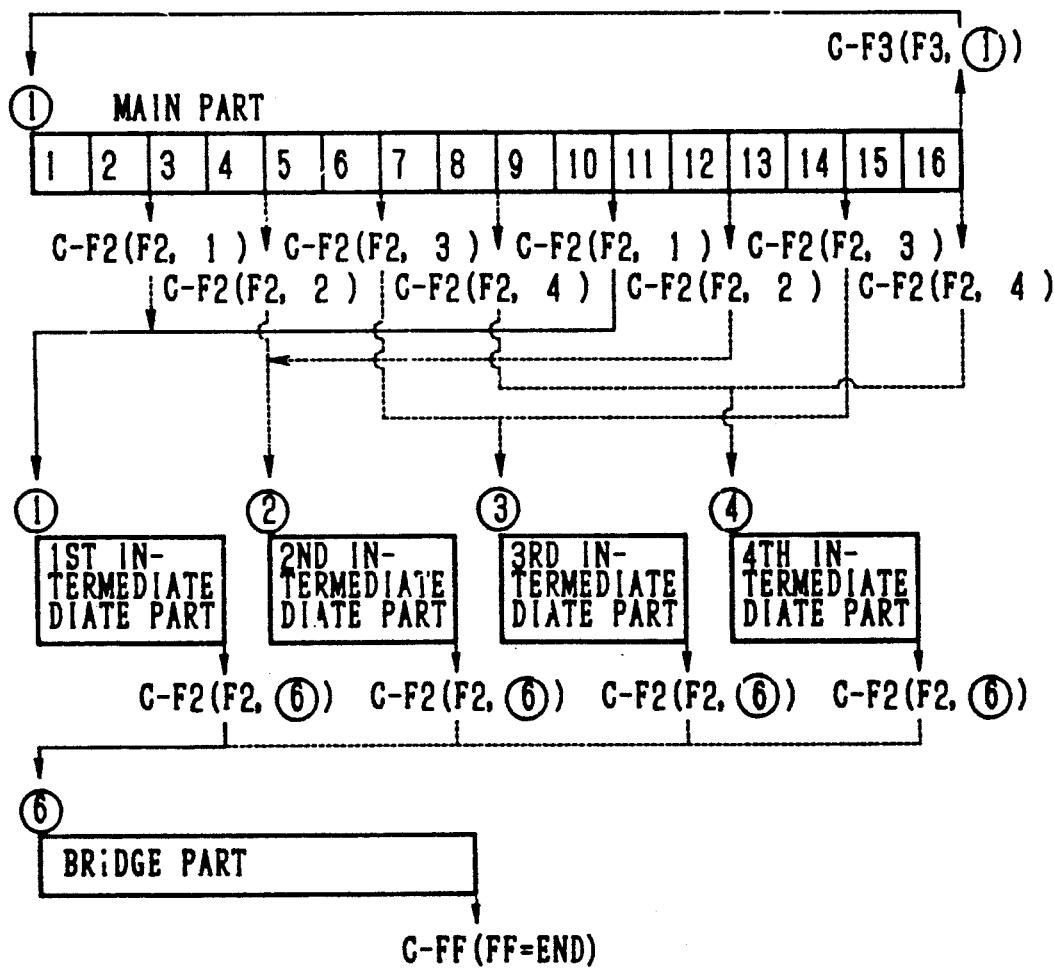
FIG. 16 is a diagram for explaining the operation of a second embodiment of the present invention.
Figure 17:
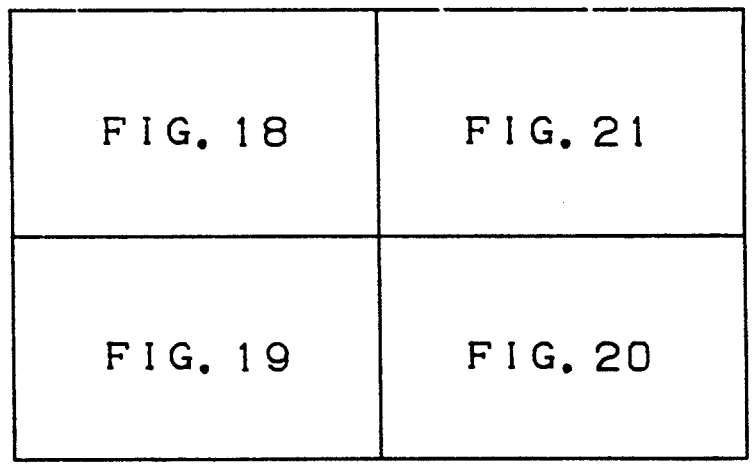
FIG. 17 shows FIGS. 18, 19, 20 and 21.
Figure 18:
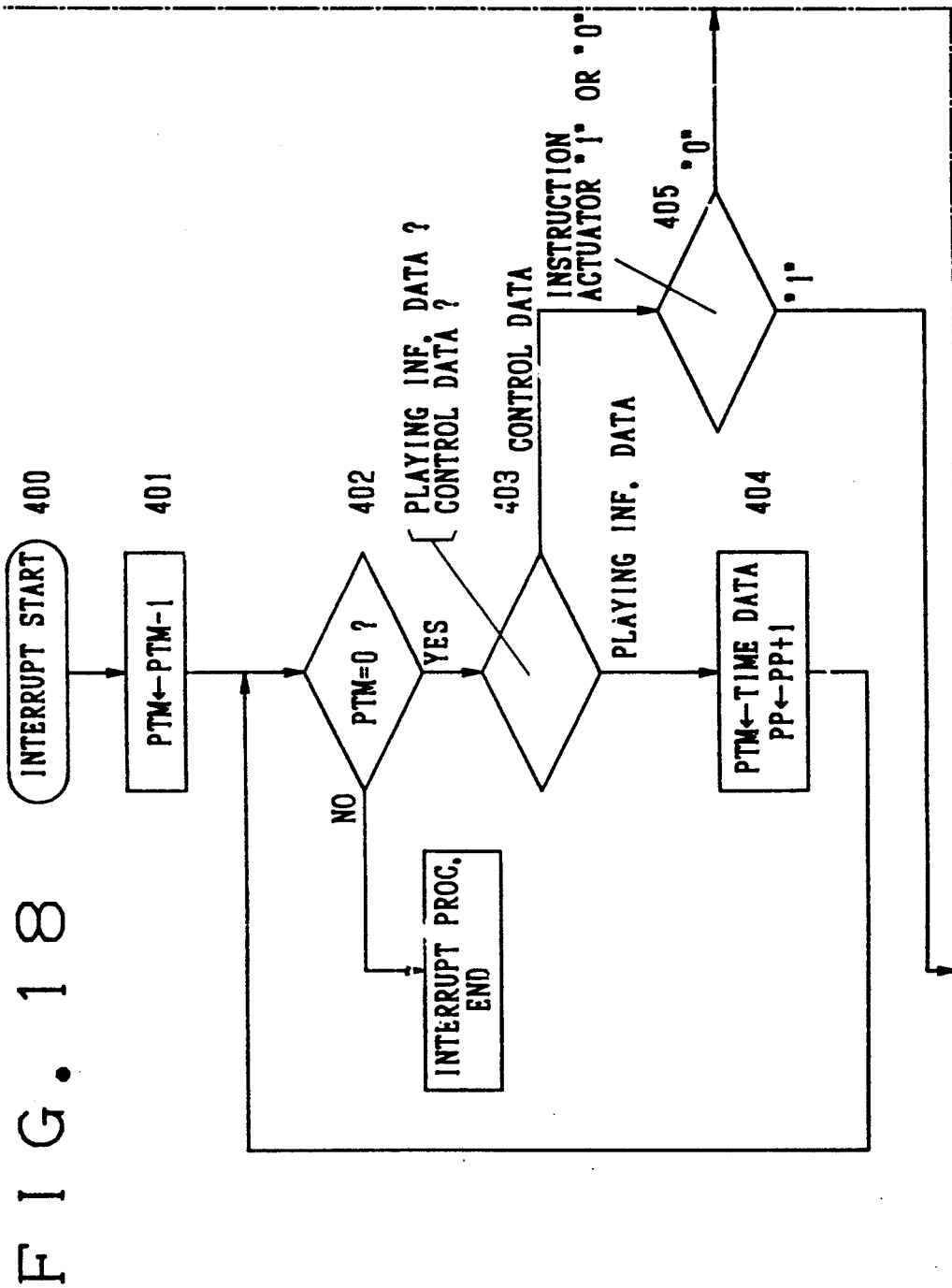
FIGS. 18, 19, 20 and 21 are diagrams showing the flow of processing in the second embodiment of the present invention.
Figure 19:
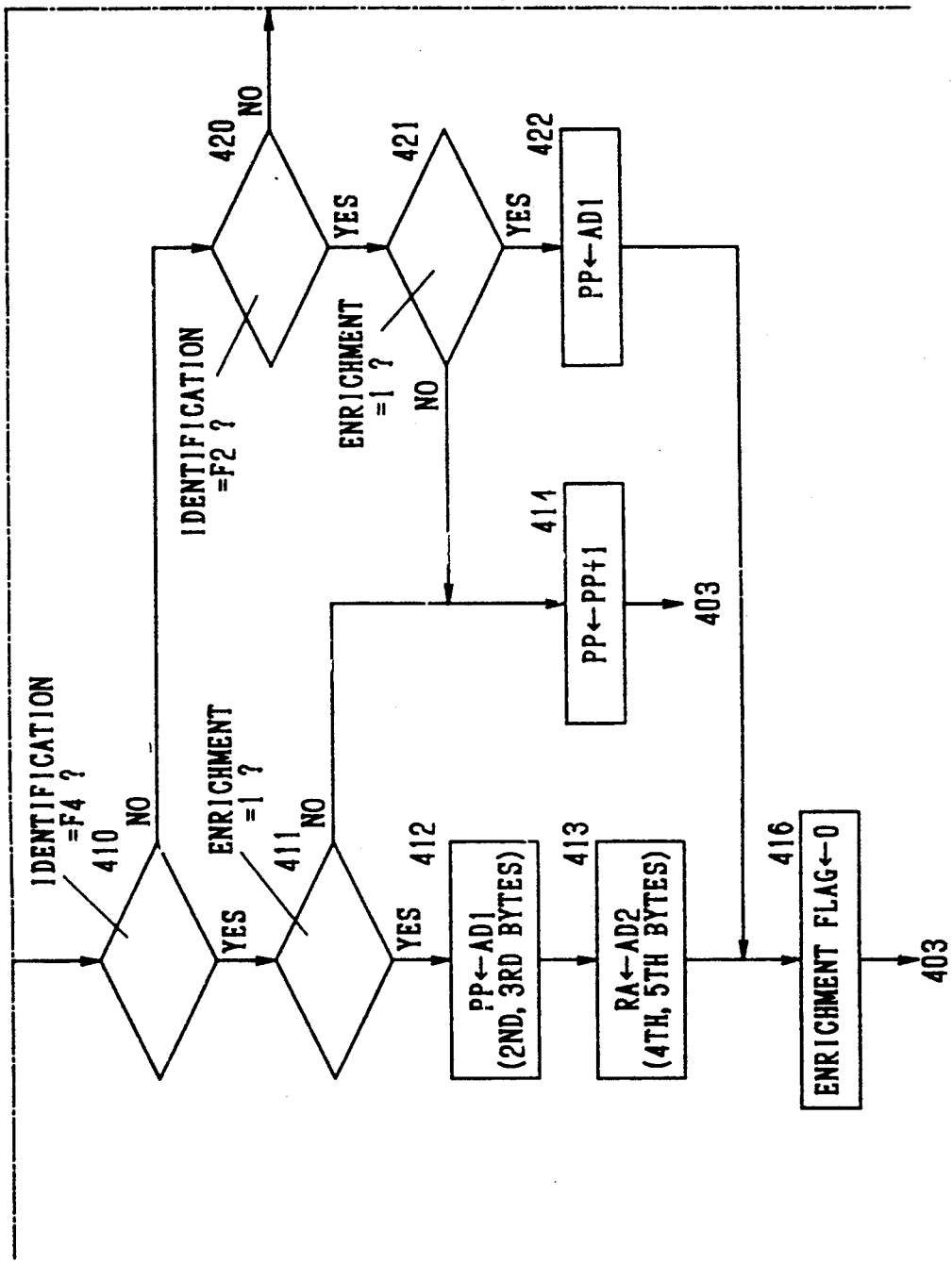
Figure 20:
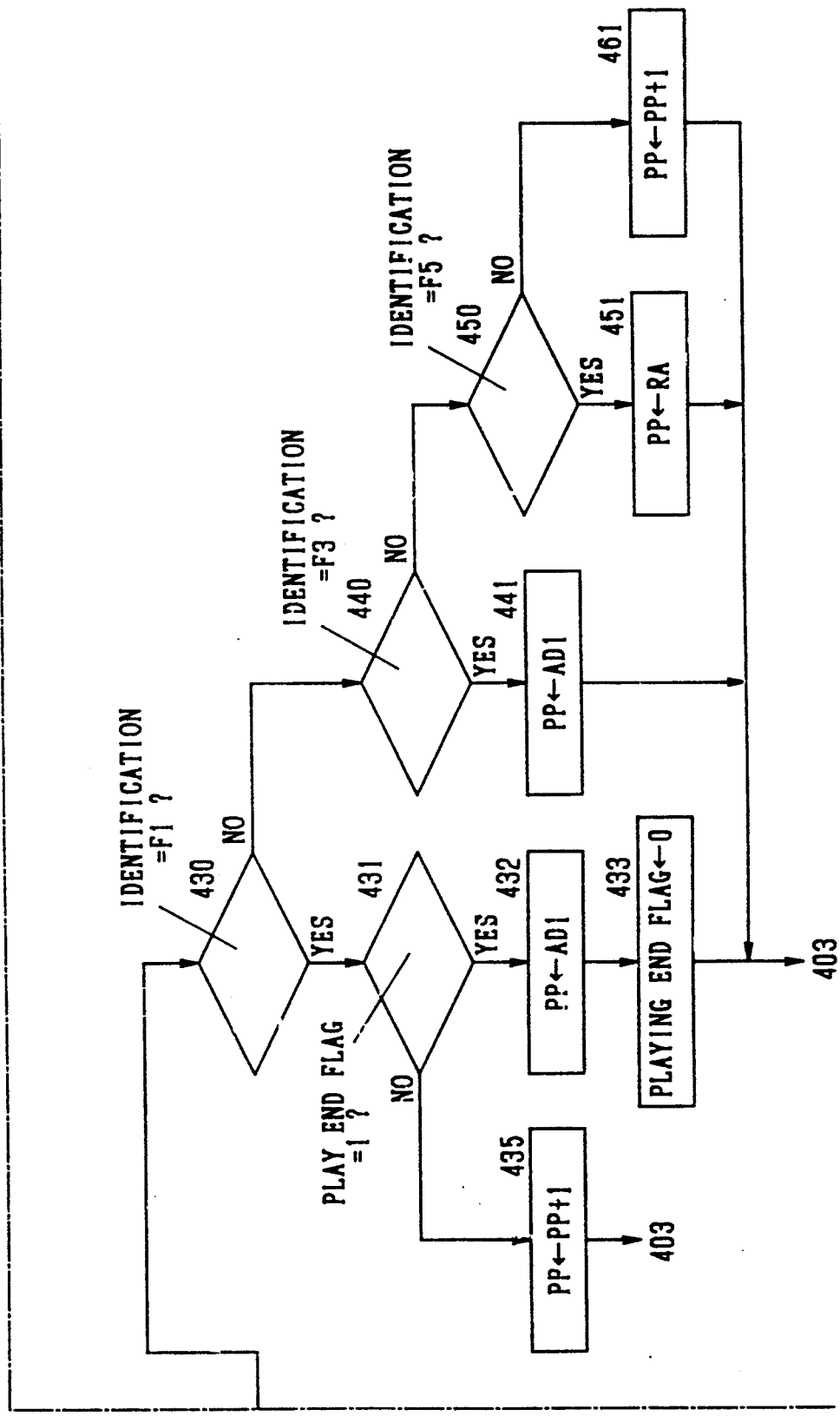
Figure 21:
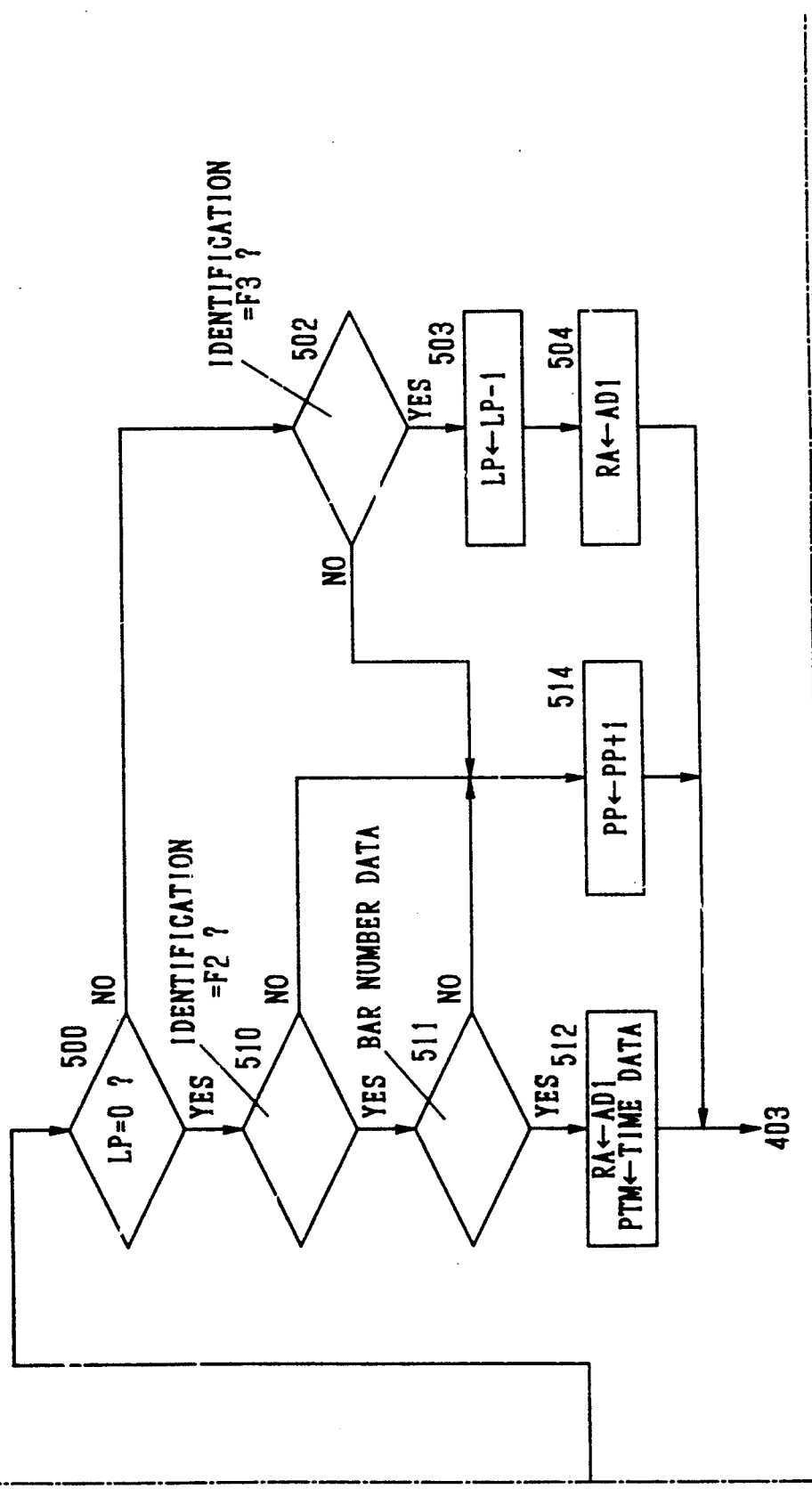

In the second embodiment of the invention, however, the playing data and the control data in the playing data memory 9 and the read address of the memory 9 bear such relationships as depicted in FIG. 16.

Relationships of the data for playing information and the control data to the read addresses Now let it be assumed that there are stored in the playing data memory 9 a piece of data for main part playing information composed of first, second, ... 16th bars, four pieces of data for first, second, third and fourth linkage part playing information and a piece of data for bridge part playing information. At the last read address of each of the second and tenth bars of the data for main part playing information, the jump control data C-F2 is stored whose identification data has the contents "F2" and whose jump address data has the contents of the address "(1)" for a jump to the readout of the data for the first linkage part playing information from the beginning thereof. At the last read address of each of the fourth and 12th bars of the data for main part playing information, the jump control data C-F2 is stored whose identification data has the contents "F2" and whose jump address data has the contents of the address "(2)" for a jump to the readout of the data for the second linkage part playing information from the beginning thereof.

At the last read address of each of the sixth and 14th bars of the data for main part playing information, the jump control data C-F2 is stored whose identification data has the contents "F2" and whose jump address data has the contents of the address "(3)" for a jump to the readout of the data for the third linkage part playing information from the beginning thereof.

At the last lead address of the eight bar of the data for main part playing information, the jump control data C-F2 is stored whose identification data has the contents "F2" and whose jump address data has the contents of the address "(4)" for a jump to the readout of the data for the fourth linkage part playing information from the beginning thereof.

At the last but one lead address of the 16th bar of the data for main part playing information, the jump control data C-F2 is stored whose identification data has the contents "F2" and whose jump address data has the contents of the address "(4)" for a jump to the readout of the data for the fourth linkage part playing information from the beginning thereof. At the last address the jump control data C-F3 is stored whose jump address data has the contents of the address "(1)" for a jump to the readout of the data for main part playing information from the beginning thereof.

At the last read address of each of the data for the first, second, third and fourth linkage part playing information, the jump control data C-F2 is stored whose identification data has the contents "F2" and whose jump address data has the contents of the address "(6)" for a jump to the readout of the data for bridge part playing information from the beginning thereof.

At the last read address of the bridge part playing information, the end control data C-FF is stored whose identification data has the content "FF".

In the second embodiment the second and third jump address data registers JP and RAS in the work area 4 need not be used but the loop number data register LP and the bar number data register LT are employed.

Further, the instruction actuator in the actuator group 8 is used.

Next, a description will be given, with reference to FIGS. 16 to 21, of the operation of a second embodiment of the automatic playing apparatus according to the present invention.

Start of Interrupt Processing

In step 400 interrupt processing starts and the process proceeds to step 401 as in the case of first embodiment.

In step 401 the value of the relative time data register PTM, which represents the remaining amount of time from the readout of a certain piece of playing data to the next piece of playing data in the playing data memory 9, is decremented by one as in the case of the first embodiment.

Next, in step 402 the value of the relative time data register PTM is checked as in the case of the first embodiment, and if its value is not "0", then the interrupt processing is finished.

If the value of the relative time data register PTM is "0" in step 402, then it is checked whether the playing data now read out of the playing data memory 9 is data for playing information or control data.

If it is determined in step 403 that the playing data is the data for playing information, then the process proceeds to step 404, wherein its three-byte event data is provided to the MIDI signal interface unit 5 and its two-byte relative time data is stored in the relative time data register PTM. Further, the value of the read address data register PP is incremented by one, permitting the readout of the next playing data. Then, he process proceeds to step 402.

If it is determined in step 403 that the playing data is control data, the process proceeds to step 405.

If it is determined in step 405 that the instruction actuator instructs the use of the enrichment actuator ("1"), the process proceeds to step 410. If it is determined that the instruction actuator instructs the use of loop number data and bar number data ("0"), the process proceeds to step 500.

If it is determined in step 410 that the identification data in the playing data being read out of the memory 9 has the contents "F4" representing the jump control data C-F4, it is checked in step 411 whether the enrichment flag, which represents the progress to the readout of the data for bridge part playing information has been instructed by turning ON the enrichment actuator, is up or "1".

If it is determined in step 411 that the enrichment flag is up or "1", address data AD1 at second and third byte positions of the control data now being read out is set in the read address data register PP in step 412, address data AD2 at fourth and fifth byte positions of the control data being read out is set in the register RA in step 413, and the enrichment flag is reset to "0" in step 416. Then the process proceeds to step 403.

If it is determined in step 411 that the enrichment flag is not up or "1", the read address data register PP is incremented by one in step 414 and then the process proceeds to step 403.

If it is determined in step 410 that the identification data is not "F4" which represents the jump control data C-F4, then it is checked in step 420 whether the identification data is "F2" which represents the jump control data C-F2.

If it is determined in step 420 that the identification data is "F2", it it checked in step 421 whether the enrichment flag is up ar "1".

If it is determined in step 421 that the enrichment flag is up or "1", then the address data AD1 of the control data is stored in the read address data register PP in step 422 and the enrichment flag is reset to "0" in step 416. Then the process proceeds to step 403.

If it is determined in step 421 that the enrichment flag is not up or "1", then the read address data register PP is inoremented by one, after which the process proceeds to step 403.

If it is determined in step 420 that the identification data is not "F2", it is checked in step 430 whether the identification data is "F1" which represents the jump control data C-F1.

If it is determined in step 430 that the identification data is "F1", it is checked in step 431 whether the play end flag, which indicates whether it has been instructed by turning OFF the playing actuator to and the playing, is up or "1".

If the play end flag is up or "1" in step 431, the address data AD1 of the jump control data C-F1 following the jump control data C-F1 now being read out is stored in the read address data register PP in step 432, and then the play end flag is reset to "0" in step 433, after which the process proceeds to step 403.

If the play end flag is note up or "1" in step 431, the read address data register PP is incremented by one in step 435 and then the process proceeds to step 403.

If it is determined in step 430 that the identification data is not "F1" which represents the jump control data C-F1, then it is checked in step 440 whether the identification data is "F3" which represents the jump control data C-F3.

If it is determined in step 440 that the identification data is "F3" which represents the jump control data C-F3, the address data AD1 of the jump control data C-F3 being read out is stored in the read address data register PP in step 441 and then the process proceeds to the step 403.

If it is determined in step 440 that the identification data is not "F3", then it is checked in step 450 whether the identification data is "F5" which represents the jump control data C-F5.

If it is determined in step 450 that the identification data is "F5", the contents of the jump address data register RA are stored in the read address data register PP and then the process proceeds to step 403. If it is determined in step 450 that the identification data is not "F5", the read address data register PP is incremented by one in the step 461 and the process proceeds to step 403.

If it is determined in step 405 that the instruction actuator has instructed the use of the loop number data and the bar number data ("0"), it is checked in step 500 whether the contents of a loop number data register LP are "0".

If it is determined in step 500 that the contents of the loop number data register LP are "0", it is checked in step 510 whether the contents of the identification data of the playing data are "F2" which represents the jump control data C-F2.

If it is determined in step 510 that the contents of the identification data are not "F2", the read address data register PP is incremented by one in step 514 and then the process proceeds to step 403.

If it is determined in step 510 that the contents of the identification data are "F2", it is checked in step 511 whether the address AD1 represented by the second and third bytes of the jump control data C-F2 is a bar number data, and if so, the address is stored in the jump address data register RA in step 512, and then the relative time data of the jump control data C-F2 read out at this time is stored in the read address data register PP, after which the process proceeds to step 403.

If it is determined in step 500 that the contents of the loop number data register LP are not "0", it is checked in step 502 whether the contents of the identification data are "F3" which represents the jump control data C-F3. If it is determined in step 502 that the contents of the identification data are "F3", the loop number data register LP is decremented by one in step 503 and the address AD1 of the jump control data C-F3 is stored in the jump address data register RA in step 504, and then the process proceeds to step 403.

If it is determined in step 502 that the contents of the identification data are not "F3", the read address data register PP is incremented by one in step 514 and the process proceeds to step 403.

Concrete Examples of Operation

Next, a description will be given, with reference to FIG. 16, of the modes in which the playing data is read out of the playing data memory 9, based on the above-described control data, in the second embodiment of the present invention.

Mode 1: Where the instruction actuator has instructed the use of the enrichment actuator In this instance, the same concrete operations as in the first embodiment are performed, though not described in detail.

Mode 2: Where the instruction actuator has instructed the use of the loop number data and the bar number data:

In this instance, as shown in FIG. 16, if the contents of the loop number data register LP are "n" in decimal (where n=0, 1, 2, ... ) and if the contents of the bar number data register LT are q in decimal (where q=1, 2, 3, 4, 5, 6, 7, 8), the data for main part playing information is read out n times from the first to 16th bars and is read out again from the first to (q×2)nd bars. Then, if q=1 or 5, the data for the first linkage part playing information is entirely read out; if q=2 or 6, the data for the second linkage part playing information is entirely read out; if q=3 or 7, the data for the third linkage part playing information is entirely read out; if q=4 or 8, the data for the forth linkage part playing information is entirely read out. Then, the data for bridge part playing information is read out.

Embodiment 3

Figure 22:
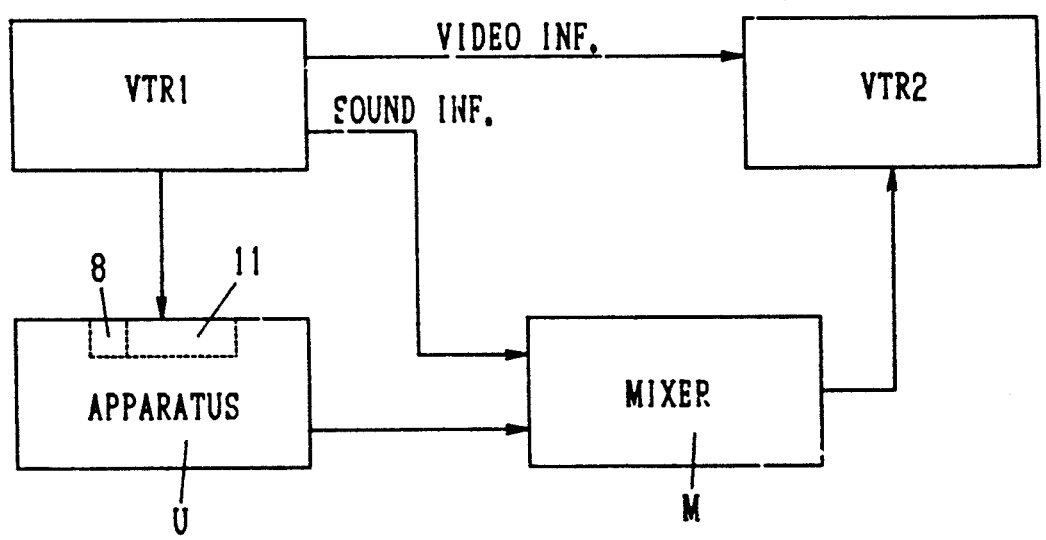
FIG. 22 is a diagram illustrating a third embodiment of the present invention.

Turning next to FIG. 22, a third embodiment of the present invention will be described.

The third embodiment depicted in FIG. 22 has two known VTRs VTR1 and VTR2 and is constructed so that the VTR1 is put in reproducing mode and the VTR2 in recording mode to record therein video information from the VTR1.

At the same time, audio information from the VTR1 and the playing information read out from the automatic playing apparatus U of the present invention as described previously in connection with its first and second embodiments are supplied to a mixer M and the mixed audio information is recorded by the VTR2.

In this case, the automatic playing apparatus U receives a time signal from the VTR2 by the time signal interface unit 11, based on the ON state of the time setting actuator in the actuator group 8, and outputs the above-said playing information to the mixer M. Consequently, the VTR2 starts recording the video signal and audio information at the time specified by the time signal from the VTR1.

While in the above the present invention has been applied to the automatic playing apparatus which employs the MIDI signal based on the MIDI standard, the invention is applicable as well to automatic playing apparatus utilizing playing information (data) based on other standards. It will be apparent that many modifications and variations may be effected without departing from the scope of the novel concepts of the present invention.

What is claimed is:

1. Automatic playing apparatus for producing an output composed of a discontinuity-free assemblage of multiple tune information comprising:
    playing information storage means which has stored therein playing information including first tune information and a plurality of pieces of second tune information related thereto;
    playing information reading means for reading out said playing information from said playing information storage means in such an order that said first tune information is followed by one of said plurality of pieces of second tune information as a discontinuity-free assemblage therewith; and
    playing information reading control means whereby said playing information reading means is controlled so that when said first tune information of said playing information has been read out of said playing information storage means to an extent that it has reached a selected one of predetermined data positions of said first tune information corresponding to triggering of playing of tune information from said plurality of pieces of second tune information, one of said plurality of pieces of second tune information corresponding to said selected position is automatically read out of said playing information storage means in proper timed relationship to playing of said first tune information.

2. The automatic playing apparatus of claim 3, which further comprises a common actuator which is operative for triggering playing the tune information from said plurality of pieces of second tune information and is manipulated in the course of reading out said first tune information of said playing information from said playing information storage means by said playing information reading means, and wherein said selected one of said predetermined data positions on said first tune information is that one of said predetermined data positions which is reached first after the manipulation of said common actuator in the course of reading out said first tune information by said playing information reading means.

3. Automatic playing apparatus for producing an output composed of a discontinuity-free essemblage of multiple tune information comprising:
    playing information storage means which has stored therein playing information including first tune information, second tune information and a plurality of pieces of intermediate tune information related to said first and second tune information;
    playing information reading means for reading out said playing information from said playing information storage means in such an order that said first tune information is followed sequentially by one of the pieces of intermediate tune information and then by second tune information as a discontinuity-free assemblage therewith; and
    playing information reading control means whereby said playing information reading means is controlled so that when said first tune information of said playing information has been read out of said playing information storage means to an extent that it has reached a selected one of predetermined data positions of said first tune information coresponding to triggering of playing of tune information from said plurality of pieces of intermediate tune information, one of said plurality of pieces of intermediate tune information corresponding to said selected position is automatically read out of said playing information storage means in proper timed relationship ot playing of said first tune information.

4. The automatic playing apparatus of claim 3, which further comprises a common actuator which is operative for triggering playing the tune information from said plurality of pieces of intermediate tune information and is manipulated in the course of reading out said first tune information of said playing information from said playing information storage means by said playing information reading means, and wherein said selected one of said predetermined data positions on said first tune information is that one of said predetermined data positions which is reached first after the manipulation of said common actuator in the course of reading out said first tune information by said playing information reading means.

* * * * *